(12) United States Patent
Patel et al.

(10) Patent No.: US 8,613,086 B2
(45) Date of Patent: Dec. 17, 2013

(54) PING AND SCAN OF COMPUTER SYSTEMS

(75) Inventors: Kaushal A. Patel, Charlotte, NC (US);
Jordan P. Havranek, Charlotte, NC (US); Peter Jordan Langsam, New York City, NY (US); Ronald Ramcharran, Hackensack, NJ (US); Iesha A. Scott, Atlanta, CA (US)

(73) Assignee: Bank of America Corporation, Charlotte, NC (US)

( * ) Notice: Subject to any disclaimer, the term of this patent is extended or adjusted under 35 U.S.C. 154(b) by 347 days.

(21) Appl. No.: 13/018,224

(22) Filed: Jan. 31, 2011

(65) Prior Publication Data
US 2012/0198556 A1 Aug. 2, 2012

(51) Int. Cl.
G06F 12/14 (2006.01)
(52) U.S. Cl.
USPC .............................. 726/22; 726/25
(58) Field of Classification Search
None
See application file for complete search history.

(56) References Cited

U.S. PATENT DOCUMENTS

| 2007/0162973 A1* | 7/2007 | Schneier et al. ................. 726/22 |
| 2007/0283441 A1* | 12/2007 | Cole et al. ........................ 726/25 |
| 2010/0332889 A1* | 12/2010 | Shneorson et al. ............... 714/2 |
| 2011/0289308 A1* | 11/2011 | Sobko et al. .................. 713/100 |

OTHER PUBLICATIONS

John Leyden, "UK gov sets rules for hacker tool ban", The Register, Jan. 2, 2008, http://www.theregister.co.uk/2008/01/02/hacker_toll_ban_guidance/.
PCT International Search Report dated May 21, 2012 for International Application No. PCT/US 12/23150.

\* cited by examiner

*Primary Examiner* — William Powers
(74) *Attorney, Agent, or Firm* — Michael A. Springs; Moore & Van Allen PLLC; Jeffrey R. Gray (57) ABSTRACT

Embodiments of the present invention provide apparatuses and methods for identifying computer systems that pose a threat for potential dissemination of confidential information, and thereafter, scanning the computer systems for unauthorized activity related to potential dissemination of confidential information. Embodiments of the invention comprise compiling a list of user computer systems that are at risk of accessing, using, or disseminating confidential information; determining whether the computer systems on the list are available for scanning; and scanning the computer systems on the list to identify an incident related to potential or actual threats or breaches of confidential information.

34 Claims, 5 Drawing Sheets

PING AND SCAN OF COMPUTER SYSTEMS

FIELD

This invention relates generally to identifying threats associated with electronic data within an organization, and more particularly, embodiments of the invention relate to apparatuses and methods for rating computer systems in terms of threat level, identifying when the computer systems are available for scanning, scanning the computer systems, and/or directing any potential threats to the appropriate resources for remediation.

BACKGROUND

Many business organizations collect and retain personal customer information, proprietary business information, and other information of a sensitive nature (hereinafter "confidential information"), such as, but not limited to social security numbers, credit card numbers, account numbers, and any other types of confidential data stored by a business. The confidential information is stored at different locations and in different ways within the organization, and consequently, the organization must monitor the use and dissemination of the confidential information in order to identify any security threats, ethical threats, unauthorized protocol, illegal copying, unauthorized correspondence, access to restricted data, blocked correspondence, etc. that include the confidential information. Organizations periodically monitor the computer systems, such as but not limited to, desktop computers, laptop computers, servers, tablet computers, phones, smart phones, personal digital assistants, etc. (hereinafter "computer systems") within the organization in order to make sure the confidential information is protected and the computer system or its user has not been involved in any unauthorized activity. Monitoring the confidential information accessed, used, and disseminated through the computer systems within an organization can be a problem because of the data storage capacity in an organization, the number of computer systems in an organization, the number of ways information can be disseminated, etc. The shear volume of potential confidential information that can be stored by an organization creates a problem because the confidential information can be easily disseminated using the computer systems and applications provided by the organization. Some organizations that might have a particularly difficult time in monitoring the access, use, and dissemination of confidential information include financial institutions, medical facilities that store patient information, online retailers that store customer financial information, etc.

Therefore, there is a need for apparatuses and methods for effectively identifying computer systems in an organization that have a higher level of risk of having confidential information compromised.

BRIEF SUMMARY

Embodiments of the present invention address the above needs and/or achieve other advantages by providing apparatuses (e.g., a system, computer program product, and/or other device) and methods for identifying computer systems that pose a threat, and thereafter, scanning the computer systems for unauthorized activity.

Embodiments of the present invention relate to systems, methods, and computer program products for compiling a list of user computer systems that are at risk of accessing, using, or disseminating confidential information; determining whether the computer systems on the list are available for scanning; and scanning the computer systems on the list to identify an incident related to potential or actual threats or breaches of confidential information.

In further accord with embodiments of the invention, the invention further comprises identifying a scanning system that is available to scan the computer systems; and wherein scanning the computer systems is accomplished through the scanning system.

In other embodiments of the invention, the invention further comprises rating the computer systems based on the riskiness of potential or actual threats or breaches of confidential information; and wherein scanning the computer systems comprises scanning the computer systems that are rated as having the most risk of potential or actual threats or breaches of confidential information.

In still other embodiments of the invention, the invention further comprises receiving user computer system information identifying the location of the computer system.

In yet other embodiments of the invention, the invention further comprises determining whether the location of the computer system is in a country that allows scanning; and preventing the scanning when the country does not allow scanning.

In further accord with embodiments of the invention, the invention further comprises categorizing the user computer system in the list by type of computer system; and wherein identifying the scanning system is based on the type of computer system being scanned.

In other embodiments of the invention, wherein determining whether the computer systems on the list are available for scanning comprises pinging the computer system to determine if the computer system is on, the computer system is active, the computer system has enough memory to support the scan, or running the scan would not negatively affect programs or applications that the computer system is running.

In yet embodiments of the invention, the invention further comprises leaving the user computer system on the list when it is not available for scanning; and scanning the user computer system at a later point in time.

In still other embodiments of the invention, the invention further comprises notifying a remediation team when the incident is identified on the computer system.

In further accord with other embodiments of the invention, the invention further comprises escalating the incident to an escalation team when the remediation team determines that the incident requires further investigation.

In other embodiments of the invention, the invention further comprises reporting the incident to a business unit to rectify the incident when the remediation team determines that the incident can be resolved.

In yet other embodiments of the invention, the invention further comprises remediating the incident when the remediation team determines that the incident does not require reporting, escalating, or further investigation or resolution.

In still other embodiments of the invention, the invention further comprises re-rating the computer systems based on the riskiness of potential or actual threats or breaches of confidential information after the incident has been remediated.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
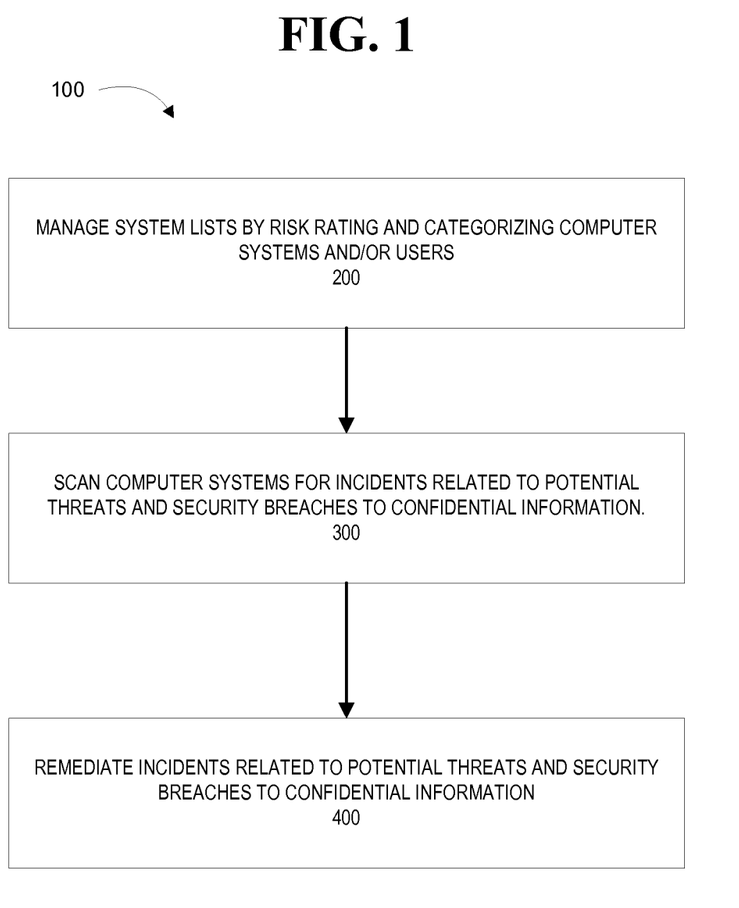
FIG. 1 provides a high level flow diagram outlining the insider threat process, in accordance with one embodiment of the invention.

FIG. 1 illustrates one embodiment of a high level flow diagram for the insider threat process 100 for identifying a threat related to the improper access, use, or dissemination of confidential information. As illustrated in block 200 of FIG. 1 the insider threat process 100 includes a system list management process 200. The system lists comprise information about the computer systems that are used within a business that allow a user to access, use, or disseminate confidential information, such as but not limited to, personal computers, laptop computers, phones, personal digital assistants ("PDAs"), databases, servers, systems, or other hardware used throughout the operation of the business ("computer systems"). The system lists contain ratings, such as but not limited to rakings, of users and/or computer systems that rate the risk that each user and/or computer system has of being a threat for the access, use, or dissemination of confidential information stored by the business. The user and/or computer system rating can be determined using multiple categories of threats, such as but not limited to a security threat, ethical threat, unauthorized protocol, illegal write attempt, blocked targeted correspondence, access to specific database, targeted correspondence that violates a rule, etc. It is understood that these categories are only examples of categories used to rate risks of users and/or computer systems and that it is understood that additional categories not mentioned herein could be used. In one embodiment of the invention the ratings are risk ratings that rank the risk of the user and/or computer system relative to the other users and/or computer systems within the business.

The ratings are calculated though the use of a correlation tool which is explained in further detail in U.S. application Ser. No. 12/694,067 and U.S. application Ser. No. 12/694,075 both titled "Insider Threat Correlation Tool," which are both incorporated by reference herein. A computer system on the system list may be rated as more risky than another computer system because the computer system or user of the computer system may have increased access to confidential information, increased contact with dangerous web-sites, increased exposure to people outside of the organization, increased communication with suppliers or customers, etc. The system lists are managed in order to make sure that the computer systems having the most risk of exposing confidential information are scanned before the computer systems having less risk are scanned, in order to identify any compromised confidential information as quickly as possible.

As illustrated in block 300 in FIG. 1, the insider threat process 100 may include a scanning process 300 for scanning the computer systems on the system lists. Within this step of the insider threat process 100 the scanners that are responsible for making the scans are checked for availability. If a scanner is available then the computer systems on the system lists are checked for availability before a scan is run in order to increase the efficiency with which the computer systems are scanned. As explained in further detail later computer systems are pinged to determine the availability of the computer system for scanning and are scanned if the ping indicates the computer system is available. In some embodiments a ping may be an inquiry into whether or not the computer system is turned on, the computer system is not active, the computer system has enough memory to support the scan, and/or running the scan would not negatively affect programs or applications that the computer system is running, etc. When performing a scan a scanner searches the memory of the computer system for any threats or security breaches related to unauthorized access, use, or dissemination of confidential information.

As illustrated in block 400 in FIG. 1 the insider threat process 100 may include investigating and fixing the source of any threats or security breaches identified in the scan and re-rate the riskiness of the user or the computer system after implementation of the fix has occurred. Thereafter, the ratings of the user and/or computer system are updated in the system lists for future scans.

Figure 2:
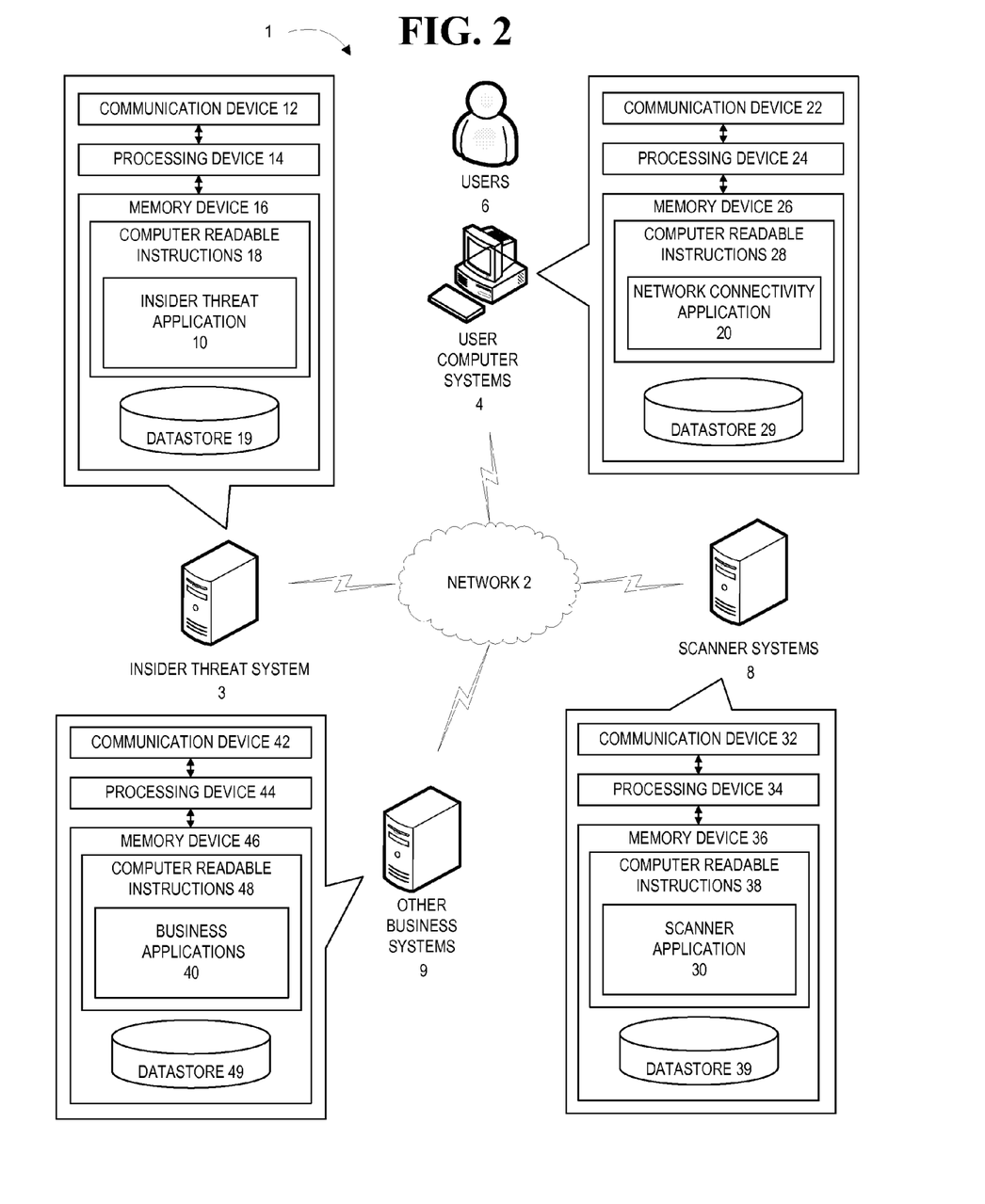
FIG. 2 provides a system environment diagram illustrating a insider threat system environment, in accordance with one embodiment of the invention.

FIG. 2 illustrates an insider threat system environment 1, in accordance with an embodiment of the present invention. As illustrated in FIG. 1, the insider threat system 3 is operatively coupled, via a network 2 to the user computer systems 4, the scanner systems 8, and other business systems 9. In this way, the insider threat system 3 can receive and send information from and to user computer systems 4, scanner systems 8, and other business systems 9 over the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network.

As illustrated in FIG. 2, the insider threat system 3 generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the user computer systems 4, scanner systems 8, and other business systems 9. As such, the communication device 12 generally comprises a modem, server, or other device for communicating with other devices on the network 2.

As further illustrated in FIG. 2, the insider threat system 3 comprises computer readable instructions 18 stored in the memory device 16, which in one embodiment include the computer-readable instructions 18 of an insider threat application 10. In some embodiments, the memory device 16 includes a datastore 19 for storing data related to the insider threat system 3, including but not limited to data created and/or used by the insider threat application 10.

The insider threat application 10 can communicate with the scanner application 30 on the scanner systems 8 to receive information about the availability of the scanner systems 8. Thereafter, the insider threat application 10 can communicate with the user computer system 4 to determine if the computer systems are available for scanning and direct the scanning systems 8 to scan the user computer systems 4 to determine if there are any incidents related to a threat or breach of access, use, or dissemination of confidential information on the individual user computer systems 4. Finally, the insider threat application 10 can communicate with remediation applications 40 located on the other business systems 9 in order to direct the incident to the proper resource, whether it be a particular person, group, system, etc., inside or outside of the business, in order to remediate the incident and implement a corrective action.

It will be understood that systems, devices, servers, processors, computers, networks, and other devices described herein may be made up of one system, device, server, processor, computer, network, etc., or numerous systems, devices, servers, processors, computers, networks, etc. working in conjunction with each other. Also, it is to be understood that use of the term computer system includes, but is not limited, desktop, laptop, smart phone, PDA, televisions with network access, or any other electronic system that has a communication device, processing device, and memory device.

As further illustrated in FIG. 2, the user computer systems 4 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the insider threat system 3, the scanner systems 8, and the other business systems 9. As such, the communication device 22 generally comprises a modem, server, or other device(s) for communicating with other devices on the network 2, and a display, camera, keypad, mouse, keyboard, microphone, and/or speakers for communicating with one or more users 6. The user 6, in some embodiments of the invention, is an employee of the business who personally has been, or whose user computer system 4 has been identified as posing a risk to accessing, using, or disseminating confidential information. In other embodiments of the invention the user 6 is an agent, contractor, or other person designated to act on behalf of the business. The confidential information could be sensitive information about a customer, user 6, or another employee at the business, and/or proprietary business information, such as, but not limited to social security numbers, credit card numbers, account numbers, health records, engineering specifications, drawings, sales data, financial data, or any other type of confidential data stored by a business.

As illustrated in FIG. 2, the user computer systems 4 comprise computer-readable program instructions 28 stored in the memory device 26, which in one embodiment includes the computer-readable instructions 28 of a network connectivity application 20. In some embodiments, the memory device 26 includes a datastore 29 for storing data related to the user computer systems 4, including but not limited to data created and/or used by the network connectivity application 20. The network connectivity application 20 allows the users 6 to send, receive, download, and upload data over the network 2, through e-mails, instant messaging, web browsers, or other communication over the network, which could result in an incident of unauthorized access, use, or dissemination of confidential information.

As further illustrated in FIG. 2, the scanner systems 8 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the insider threat system 3, the user computer systems 4, and the other business systems 9. As such, the communication device 32 generally comprises a modem, server, or other device(s) for communicating with other devices on the network 2.

As illustrated in FIG. 2, the scanner systems 8 comprise computer-readable program instructions 38 stored in the memory device 36, which in one embodiment includes the computer-readable instructions 38 of a scanner application 30. In some embodiments, the memory device 36 includes a datastore 39 for storing data related to the scanner systems 8, including but not limited to data created and/or used by the scanner application 30. The scanner application 30 captures, stores, sends, and receives information to and from the insider threat system 3, user computer systems 4, and other business systems 9 about the process of scanning the user computer systems 4. The scanner application 30 accesses the memory device 26 of the user computer systems 4 and identifies any potential threat to the access, use, or dissemination of confidential information. The scanner application 30 then sends information about the threat to the insider threat application 10 in order to remediate the potential threat or breach of confidential information.

As further illustrated in FIG. 2, the other business systems 9 generally comprise a communication device 42, a processing device 44, and a memory device 46. The processing device 44 is operatively coupled to the communication device 42 and the memory device 46. The processing device 44 uses the communication device 42 to communicate with the network 2, and other devices on the network 2, such as, but not limited to, the insider threat system 3, the user devices 4, and the scanner systems 8. As such, the communication device 42 generally comprises a modem, server, or other device(s) for communicating with other devices on the network 2.

As illustrated in FIG. 2, the other business systems 9 comprise computer-readable program instructions 48 stored in the memory device 46, which in one embodiment includes the computer-readable instructions 48 of remediation applications 40. In some embodiments, the memory device 46 includes a datastore 49 for storing data related to the other business system 9, including but not limited to data created and/or used by the remediation applications 40. The remediation applications 40 are used by various people, groups, and systems within the bank to investigate, determine the cause of, and implement corrective actions for the potential threats or breaches of confidential information that occurred on user computer systems 4 that were identified by the insider threat application 10.

Figure 3:
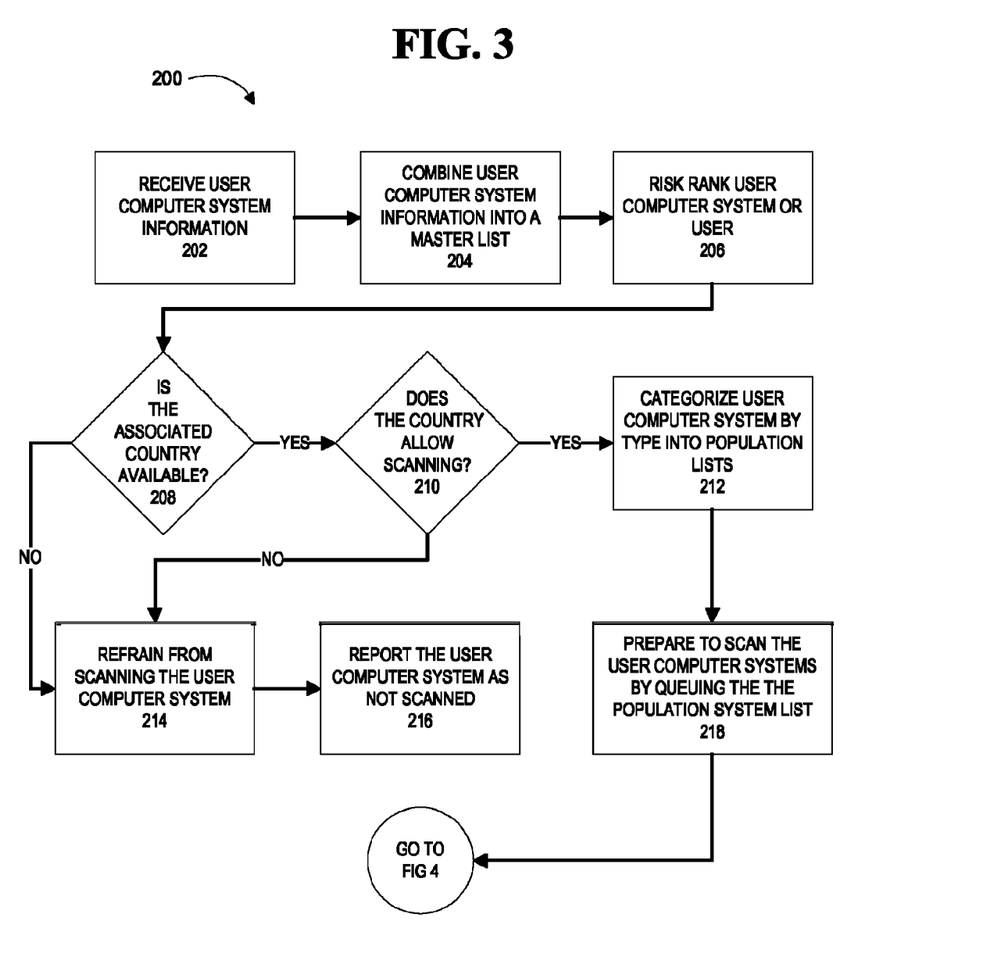
FIG. 3 provides a flow diagram outlining the process for managing computer system lists, in accordance with one embodiment of the invention.

FIG. 3 illustrates a flow diagram outlining the system list management process 200 for managing system lists, in accordance with one embodiment of the invention. As illustrated in block 202, the first step in managing the system list may be that the insider threat application 10 receives user computer system information about the user computer systems 4. The user computer system information includes but is not limited to the location, domain, internet protocol ("IP") address, server location, location thread, or any other type of user computer system information that allows the insider threat application 10 to determine the location of the computer system or allows the insider threat application 10 or other application to access the user computer system 4. In some embodiments of the invention, information about user computer systems 4 is received by the insider threat application 10 directly from each user computer system 4. In other embodiments of the invention, user computer system information is stored in computer system management applications. Therefore, in these embodiments the insider threat application 10 receives information about multiple user computer systems 4 from one or more systems throughout the business that store location or user computer system access information about multiple user computer systems 4. Thereafter, as illustrated by block 204, the insider threat application 10 may combine the user computer system information into a single master system list.

As illustrated by block 206 in FIG. 3, the user computer systems 4 may be risked rated by the insider threat application 10. The risk rating may be based on one or more of a number of factors. For example, the overall risk score of a user computer system 4 can be determined, at least in part, from individual risk scores associated with any communication that a user of the computer system made that included confidential information. Furthermore, the overall risk score of a user computer system 4 can be based, in part, on the access users 6 of a computer system have to applications, systems, and/or servers within the business that have sensitive or confidential information stored thereon. The overall risk score may also be based, in part, on the exceptions or privileges that a user 6 has with respect to write to or save from databases that contain confidential information. In some embodiments of the invention the risk rating is based on the user computer system 4, the users 6 that have access to the user computer system 4, or a combination of both. The risk rating algorithm and process used to risk rate the user computer systems are described in depth in U.S. application Ser. No. 12/694,067 and U.S. application Ser. No. 12/694,075 both titled "Insider Threat Correlation Tool," which are incorporated herein by reference.

As illustrated by decision block 208, the insider threat application 10 may determine in which country the user computer system 4 is located or belongs to based on the information received in block 202. In some countries it is illegal to scan the memory of a computer system on a network, even if the reason is to identify compromised confidential information, because it violates personal privacy laws. Therefore, if the country associated with the user computer system 4 cannot be determined then, in some embodiments, the insider threat application 10 will refrain from scanning the user computer system 4, as illustrated by block 214 in FIG. 3. In some embodiments, as illustrated in block 216 the insider threat application 10 reports that the user computer system 4 was not scanned and/or indicates in the master system list that the country could not be determined. In some embodiments the user computer system 4 may be removed from the master system list when the country cannot be identified.

Alternatively, if the identity of the country of the user computer system 4 is available then the insider threat application 10 determines if the country allows scanning of user computer systems 4, as illustrated by decision block 210. If the country in which the user computer system 4 is located does not allow scanning then the insider threat application 10 refrains from scanning the user computer system 4, as illustrated by block 214 in FIG. 3. Furthermore, in some embodiments of the invention, if the user computer system 4 is not located in a country that prohibits scanning, but the scanner systems 8 would have to use systems that are located in the country in order to scan the user computer system 4, then the insider threat application 10 may refrain from scanning the user computer system 4. Thereafter, in some embodiments, as previously explained, the insider threat application 10 reports that the user computer system 4 was not scanned and/or indicates in the master system list that the country does not allow scanning of user computer systems 4, as illustrated in block 216. In some embodiments, the computer system would be removed from the master system list when the country does not allow scanning.

If the country allows scanning, the user computer system 4 may be marked in the master system list as ready for scanning and categorized by the type of user computer system 4, as illustrated by block 212 in FIG. 3. The categories of user computer systems 4 is based on such criteria as whether the user computer system 4 is a desktop, laptop, PDA, GPS computer system, or any other type of user computer system 4 that a business may want to track that has access to or may be used to disseminate confidential information. Furthermore, the categories of user computer systems 4 could relate to the location of the user computer systems 4, lines of business with which the user computer systems 4 are associated, groups within the lines of business with which the user computer systems 4 are associated, etc. In some embodiments the user computer systems 4 that are ready for scanning could be categorized as "ready for scanning" within the master system list itself. In other embodiments of the invention, an identifier for user computer systems 4 that are ready for scanning could be exported to one or more approved population system lists that are separated based on the categories of user computer systems 4. It is to be understood that the master system lists, population system lists, or some other list can be used to list the user computer system 4 that are ready to be scanned. Therefore, where the process described herein discusses using the population list, it is to be understood that the process may be performed instead using the master system list or some other list. Once the user computer systems 4 have been properly categorized, as illustrated by block 218, the insider threat application 10 may prepare to scan the user computer systems 4 by queuing the list of user computer systems 4 for scanning (i.e. the master list, the population list, or some other list).

Figure 4:
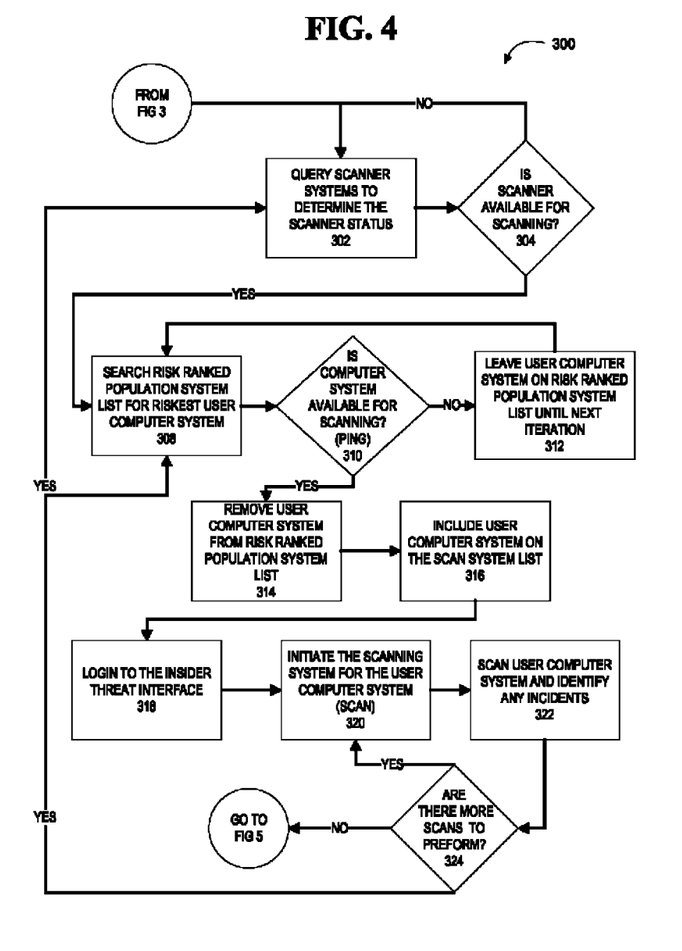
FIG. 4 provides a flow diagram outlining the process for scanning computer systems, in accordance with one embodiment of the invention.

After the lists of user computer systems 4 that may be scanned are determined, categorized, and queued for scanning, the process of scanning the user computer systems 4 may begin. FIG. 4 illustrates a flow diagram outlining a scanning process 300 for scanning user computer systems 4, in accordance with one embodiment of the invention. As illustrated by block 302, the insider threat application 10 queries the scanner systems 8 to determine the availability status of the scanner systems 8. In some embodiments there may be only one scanner system 8, which is used for scanning all of the user computer systems 4 in the business. In other embodiments of the invention, the business may need more than one scanner system 8 in order to have enough scanning capacity to cover the user computer systems 4 in the business that were identified for scanning.

As illustrated in decision block 304, if a scanner system 8 is not available for scanning then the insider threat application 10 returns to block 302 to identify another scanner system 8 that can be used to scan the user computer systems 4 on the population system list. In some embodiments of the invention if a scanner system 8 is already in the process of scanning a user computer system 4 then the scanner system 8 may not be available for scanning and the insider threat application 10 may find another scanner system 8 that can scan the user computer systems 4 in the population list. In other embodiments of the invention the scanner systems 8 may be able to scan more than one user computer system 4 at a time, but the scanner system 8 may be already scanning to many computer systems to scan another user computer system 4, or alternatively the scanning system 8 may run at a slower pace if it is asked to scan multiple user computer systems 4. In some embodiments of the invention a scanner system 8 is only set up to scan a certain type of user computer system 4. For example, one scanner system 8 may only be set up to scan laptop computers, while another scanner system 8 may only be set up to scan PDAs. Still in other embodiments, scanner systems 8 may only be able to scan user computer systems 4 in a particular region, line of business, group within a line of business, etc. In some embodiments of the invention a scanner system 8 may be able to scan more than one type of user computer system 4 and in more than one region, line of business, or group, but may not be able to scan all types of user computer systems 4, regions, lines of business, groups, etc. The insider threat application 10 may continue to query the scanner systems 8 until it can identify a scanner system 8 that can scan one or more of the user computer systems 4 listed on the population system list.

When a scanner system 8 becomes available, as illustrated by block 308 in FIG. 4, the insider threat application 10 may determine the user computer system 4 on the population system list to scan, based at least in part on the risk rating of the user computer system 4 or user 6. In other embodiments of the invention the user computer system 4 selected for scanning may also be based in part on the types of user computer systems 4 that a scanner system 8 is configured to scan.

Thereafter, as illustrated by decision block 310, the insider threat application 10 may ping the user computer system 4 to determine if the user computer system 4 is available for scanning. The insider threat application 10, in some embodiments, pings each user computer system 4 on the population system beginning with the user computer systems having the most risky rating until the insider threat application 10 identifies a user computer system 4 that is available for scanning In other embodiments of the invention, the insider threat application 10 pings all user computer systems 4 associated with the riskiest user 6 first, and then pings all the user computer systems 4 associated with the next riskiest user 4 next, etc. In still other embodiments of the invention, the insider threat application 10 can randomly select the user computer system 4 to ping based on a threshold level of riskiness. In other embodiments of the invention the insider threat application 10 can randomly select any user computer system 4 on the population system list, or use some other method of selecting the user computer system 4 on the population system list for pinging and thereafter scanning.

After the insider threat application 10 pings a user computer system 4, it may receive information back from the user computer system 4 that it pinged indicating whether or not the user computer system 4 is available for scanning. A user computer system 4 may not be available for scanning if the user computer system 4 is not currently online, if the user computer system 4 is in the process of running a program or application, if the user computer system 4 is using too much memory on other operations, if the user computer system 4 is scheduled to shut down or run a program or application during the time it would take to run the scan, etc. Therefore, if the user computer system 4 is not available for scanning, as illustrated by block 312 in FIG. 4, the user computer system 4 is left on the risk ranked population system list until the user computer system 4 becomes available for scanning In some embodiments of the invention the insider threat application 10 moves the unavailable user computer system 4 to the bottom of the population system list, and will try to scan the user computer system 4 again when it becomes the next in line on the population system list. In other embodiments of the invention, the insider threat application 10 pings the next user computer system on the population system list and checks the availability of the first user computer system 4 at some later point in time. The later point in time could be after the insider threat application 10 has pinged the rest of the user computer systems 4 on the list, after it pings each subsequent user computer system 4 on the list it could return to the top of the list, at any time after the user computer system was initially marked unavailable, etc.

Alternatively, if the user computer system 4 is available for scanning, as illustrated by block 314, the user computer system 4 may be removed from the risk ranked population system list (or the master system list in some embodiments of the invention). Then, as illustrated by block 316 the user computer system 4 may be added to the scan system list. The scan system list is a list of user computer systems 4 that are ready to be scanned by the specific available scanner system 8. In some embodiments of the invention the user computer system 4 does not need to be removed from the risk ranked population system list and moved to the scan system list. In some embodiments of the invention the user computer systems 4 can be marked as ready for scanning in either the mater system list or the population system list.

As illustrated by block 318, in some embodiments of the invention an associate within the business may log into an insider threat interface 318 of the insider threat application 10 in order to view the scan system list outlining the available user computer systems 4 that can be scanned. Thereafter, the associate initiates the scan for the user computer systems 4 on the scan system list, as illustrated by block 320. In some embodiments the associate can manually select the available user computer systems 4 on the scan system list to scan through the insider threat interface. In other embodiments of the invention the insider threat application 10 automatically scans the riskiest user computer system 4 on the scan system list. In other embodiments of the invention, the user computer systems 4 on the scan system list are scanned randomly, in accordance with other methods based on the risk rating of the user computer systems 4, and/or in accordance with other method based on the availability as determined by the ping response.

As illustrated in block 322, the insider threat application 10 may direct the scanner system 8 to scan the user computer systems 4 for any incidents that might have occurred on the computer system since the last time the user computer system 4 was scanned, by searching the memory, hard drive, etc of the user computer system 4. Any incidents identified during the scan are recorded. In some embodiments of the invention, when a computer system is identified as available for scanning, as illustrated in decision block 310, the insider threat application 10 may directly move to block 320 or block 322 to initiate the scan and scan the user computer system 4 without having to include the user computer system 4 on a scan system list and without having an associate login to a insider threat interface to initiate the scan.

Once the scanner systems 8 scan the user computer system 4 and the information about the scan is sent to the insider threat application 10, the insider threat application 10 may determine if there are any more scans to make, as illustrated by decision block 324. In some embodiments where there are more user computer systems 4 to scan on the scan list, the scanning process 300 continues at block 320. In other embodiments, the scanning process 300 returns to block 302 and the scanner system 8 waits for instructions from the insider threat application 10 to scan one or more additional user computer systems 4. In still other embodiments of the invention, the process from decision block 324 returns to block 308. In these embodiments the scanner system 8 may have a queue of risked ranked user computer systems 4 to ping and scan, so once the scanner system 8 completes the scan of one user computer system 4 or one group of user computer systems 4 on the scan system list, the scanner system 8 may automatically move on to the next user computer system 4 or group of user computer systems 4 on the population system list when the scanner system 8 becomes available.

Figure 5:
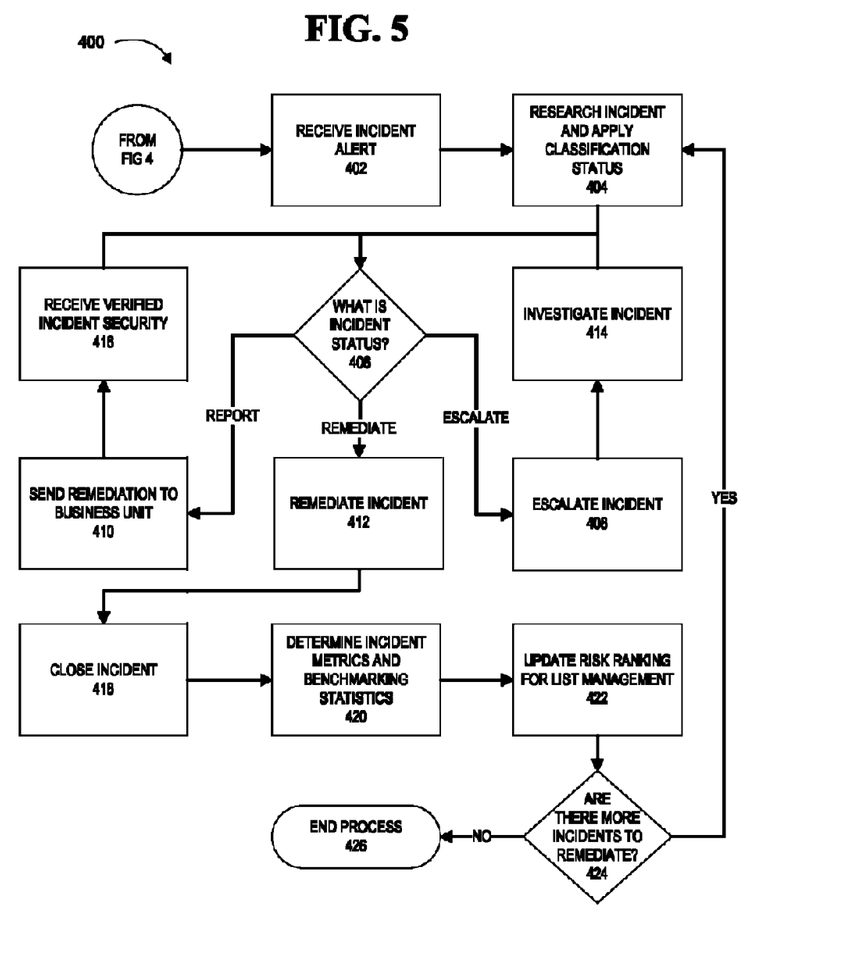
FIG. 5 provides a flow diagram outlining the process for remediating insider threats, in accordance with one embodiment of the invention.

After an incident is identified for potential threats or security breaches related to confidential information the remediation process 400 may begin. In some embodiments of the invention, the scanning process 300 and remediation process 400 can occur concurrently. For example, once an incident is identified from a scan and reported, the remediation process 400 for that incident can begin while the scanner system 8 continues to scan the same user computer system 8 or scans other user computer systems 8 in order to identify any additional incidents.

FIG. 5 illustrates the remediation process 400 in accordance with one embodiment of the invention. As illustrated by block 402 in FIG. 5, if a scan has identified an incident on a user computer system 4 the insider threat application creates an incident alert and the alert is received by one or more individuals charged with remediation of the incident (hereinafter "remediation team"). In some embodiments of the invention the remediation team receives the incident alert through the insider threat application 10 located on the insider threat system 3. In some embodiments of the invention, the remediation team may be separate from the insider threat system 3 and may receive the incident alert on the other business systems 9 at the business. The remediation team researches the incident and applies a classification status to the incident, as illustrated by block 404 in FIG. 5. In some embodiments, the incident status relates to how the incident may be handled within the business by escalating, remediating, or reporting the incident, as illustrated by decision block 406. In other embodiments of the invention the incident status may include other status indicators other than escalation, remediation, or reporting.

As illustrated by block 412, when the remediation team decides that the incident can be remediated easily or the incident does not need to be further investigated, the remediation team indicates the status of the incident as remediated. In these embodiments the remediation team finds during the investigation of the incident that there was no issue that needed attention within the business therefore, the incident does not need further examination.

As illustrated by block 410 if the incident is related to potential threats or security breaches to confidential information the business may require that an individual or group (hereinafter "business unit") within the business take an action with respect to the user computer systems 4 or the user 6. In these embodiments the remediation team may report the incident to the proper business unit. For example, if the incident relates to improper e-mails that have been sent with unauthorized confidential information, the details of the incident may be forwarded to human resources or another business unit within the business. If the incident relates to improper software on a user computer system 4 that could allow a hacker to access confidential information, the incident may be sent to the Internet Technology ("IT") group so the IT group can remove the software from the user computer system 4. The appropriate business unit fixes the bug, process, system, etc. and the remediation team and/or the insider threat application 10 receives verification that the business unit secured the incident, as illustrated by block 416. For example, the business unit, such as the IT department can confirm that they removed the unauthorized software on the user computer system 4.

If the remediation team determines that the incident cannot be remediated or reported to a business unit to incorporate a fix, and instead requires further escalation, the incident may be scrutinized by additional management and business teams to determine the status. In these embodiments the remediation team escalates the incident, as illustrated by block 408. For example, if the incident identified is related to a user 6 trying to save confidential information on multiple occasions, then the remediation group may escalate the incident for further investigation. As illustrated by block 414 an individual or group would investigate the incident further (hereinafter "escalation team") until the escalation team could remediate the incident or report it to a business unit, as illustrated by block 412. In some embodiments of the invention, the escalation team may determine that the incident cannot be remediated easily and action needs to be taken by a business unit. In these embodiments the escalation team or the remediation team may remediate the incident or report it to the business unit to be fixed, as illustrated by decision block 406.

As illustrated by decision block 418 after the incident has been remediated, the incident may be closed. Thereafter, as illustrated by block 420, incident metrics and benchmarking statistics may be determined. Then, as illustrated by block 222, the risk rankings for the user computer system 4 and/or the user 6 may be updated according to the to the algorithms and processes described in U.S. application Ser. No. 12/694, 067 and U.S. application Ser. No. 12/694,075, which are incorporated herein by reference, and saved in the insider threat application 10. The remediation team may research the next incident alert identified as illustrated by block 404. However, if there are no more incidents to remediate the process may end as illustrated by termination block 424.

As will be appreciated by one of ordinary skill in the art in view of this disclosure, the present invention may be embodied as an apparatus (including, for example, a system, machine, computer system, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or computer system. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage computer system. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A method comprising:
    compiling, by a processor, a list of user computer systems within a company that are at risk of accessing, using, or disseminating confidential information;
    receiving, by the processor, user computer system information identifying the location of the computer systems on the list;
    determining, by the processor, whether the locations of the computer systems are in a country that allows scanning of user computer systems by the company;
    preventing, by the processor, the scanning of one or more of the computer systems when the country in which one or more of the computer systems are located does not allow scanning of the computer systems by the company;
    pinging, by the processor, the computer systems for determining whether the computer systems on the list are available for scanning when the country in which one or more of the computer systems are located does allow scanning of the computer systems by the company, wherein determining whether the computer systems on the list are available for scanning comprises:
        determining if the computer systems are on a network,
        determining if the computer systems are running a program or application,
        determining if the computer systems have enough memory to run the scan, and
        determining if the computer systems are scheduled to shut down or run a scheduled program or application during the duration of the scan; and
    scanning the computer systems on the list to identify an incident related to potential or actual threats or breaches of confidential information when
        the computer systems are identified on the network,
        the program or application running would not be affected,
        the computer systems have enough memory to run the scan, and the computer systems are not scheduled to shut down or run the scheduled program or application during the duration of the scan.

2. The method of claim 1 further comprising:
identifying a scanning system that is available to scan the computer systems; and
wherein scanning the computer systems is accomplished through the scanning system.

3. The method of claim 2 further comprising:
categorizing the user computer system in the list by type of computer system; and
wherein identifying the scanning system is based on the type of computer system being scanned.

4. The method of claim 1 further comprising;
rating the computer systems based on the riskiness of potential or actual threats or breaches of confidential information; and
wherein scanning the computer systems comprises scanning the computer systems that are rated as having the most risk of potential or actual threats or breaches of confidential information.

5. The method of claim 1, further comprising:
leaving the user computer system on the list when it is not available for scanning; and
scanning the user computer system at a later point in time.

6. The method of claim 1, further comprising:
notifying a remediation team when the incident is identified on the computer system.

7. The method of claim 6, further comprising:
escalating the incident to an escalation team when the remediation team determines that the incident requires further investigation.

8. The method of claim 6, further comprising:
reporting the incident to a business unit to rectify the incident when the remediation team determines that the incident can be resolved.

9. The method of claim 6, further comprising:
remediating the incident when the remediation team determines that the incident does not require reporting, escalating, or further investigation or resolution.

10. The method of claim 1, further comprising:
re-rating the computer systems based on the riskiness of potential or actual threats or breaches of confidential information after the incident has been remediated.

11. A system comprising:
a memory device having computer readable program code store thereon;
a communication device; and
a processing device operatively coupled to the memory device, and the communication device, wherein the processing device is configured to execute the computer readable program code to:
  compile a list of user computer systems within a company that are at risk of accessing, using, or disseminating confidential information;
  ping the computer systems to determine whether the computer systems on the list are available for scanning, wherein determining whether the computer systems on the list are available for scanning comprises:
    determining if the computer systems are on a network,
    determining if the computer systems are running a program or application,
    determining if the computer systems have enough memory to run the scan, and
    determining if the computer systems are scheduled to shut down or run a scheduled program or application during the duration of the scan; and
  scan the computer systems on the list to identify an incident related to potential or actual threats or breaches of confidential information when
    the computer systems are identified on the network,
    the program or application running would not be affected,
    the computer systems have enough memory to run the scan, and
    the computer system is not scheduled to shut down or run the scheduled program or application during the duration of the scan.

12. The system of claim 11, wherein the processing device is further configured to:
identify a scanning system that is available to scan the computer systems; and
scan the computer systems through the scanning system.

13. The system of claim 12, wherein the processing device is further configured to:
categorize the user computer system in the list by a type of computer system; and
identify the scanning system based on the type of computer system being scanned.

14. The system of claim 11, wherein the processing device is further configured to:
rate the computer systems based on the riskiness of potential or actual threats or breaches of confidential information; and
scan the computer systems that are rated as having the most risk of potential or actual threats or breaches of confidential information.

15. The system of claim 11, wherein the processing device is further configured to:
receive user computer system information identifying the location of the computer systems on the list.

16. The system of claim 15, wherein the processing device is further configured to:
determine whether the location of the computer systems are in a country that allows scanning of user computer systems by the company;
prevent the scan of one or more of the computer systems when the country in which one or more of the computer systems are located does not allow scanning of the computer systems by the company; and
ping the computer systems when the country in which one or more of the computer systems are located does allow scanning.

17. The system of claim 11, wherein the processing device is further configured to:
leave the user computer system on the list when it is not available for scanning; and
scan the user computer system at a later point in time.

18. The system of claim 11, wherein the processing device is further configured to:
notify a remediation team when the incident is identified on the computer system.

19. The system of claim 18, wherein the processing device is further configured to:
escalate the incident to an escalation team when the remediation team determines that the incident requires further investigation.

20. The system of claim 18, wherein the processing device is further configured to:
report the incident to a business unit to rectify the incident when the remediation team determines that the incident can be resolved.

21. The system of claim 18, wherein the processing device is further configured to:

remediate the incident when the remediation team determines that the incident does not require reporting, escalating, or further investigation or resolution.

22. The system of claim 11, wherein the processing device is further configured to:
re-rate the computer systems based on the riskiness of potential or actual threats or breaches of confidential information after the incident has been remediated.

23. A computer program product, the computer program product comprising at least one non-transitory computer-readable medium having computer-readable program code portions embodied therein, the computer-readable program code portions comprising:
an executable portion configured for compiling a list of user computer systems within a company that are at risk of accessing, using, or disseminating confidential information;
an executable portion configured for pinging the computer systems for determining whether the computer systems on the list are available for scanning, wherein determining whether the computer systems on the list are available for the scanning comprises:
determining if the computer systems are on a network, determining if the computer systems are running a program or application,
determining if the computer systems have enough memory to run the scan, and
determining if the computer systems are scheduled to shut down or run a scheduled program or application during the duration of the scan; and
an executable portion configured for scanning the computer systems on the list to identify an incident related to potential or actual threats or breaches of confidential information when the computer systems are identified on the network,
the program or application running would not be affected,
the computer systems have enough memory to run the scan, and
the computer systems are not scheduled to shut down or run the scheduled program or application during the duration of the scan.

24. The computer program product of claim 23 further comprising:
an executable portion configured for identifying a scanning system that is available to scan the computer systems; and
wherein scanning the computer systems is accomplished through the scanning system.

25. The computer program product of claim 24 further comprising:
an executable portion configured for categorizing the user computer system in the list by type of computer system; and
wherein the executable portion configured for identifying the scanning system is based on the type of computer system being scanned.

26. The computer program product of claim 23 further comprising:
an executable portion configured for rating the computer systems based on the riskiness of potential or actual threats or breaches of confidential information; and
wherein the executable portion configured for scanning the computer systems comprises scanning the computer systems that are rated as having the most risk of potential or actual threats or breaches of confidential information.

27. The computer program product of claim 23 further comprising:
an executable portion configured for receiving user computer system information identifying the location of the computer systems on the list.

28. The computer program product of claim 27 further comprising:
an executable portion configured for determining whether the location of the computer systems are in a country that allows scanning of user computer systems by the company;
an executable portion configured for preventing the scanning of one or more of the computer systems when the country in which one or more of the computer systems are located does not allow scanning of the computer systems by the company; and
ping the computer systems when the country in which one or more of the computer systems are located does allow scanning of the computer systems by the company.

29. The computer program product of claim 23 further comprising:
an executable portion configured for leaving the user computer system on the list when it is not available for scanning; and
an executable portion configured for scanning the user computer system at a later point in time.

30. The computer program product of claim 23 further comprising:
an executable portion configured for notifying a remediation team when the incident is identified on the computer system.

31. The computer program product of claim 30 further comprising:
an executable portion configured for escalating the incident to an escalation team when the remediation team determines that the incident requires further investigation.

32. The computer program product of claim 30 further comprising:
an executable portion configured for reporting the incident to a business unit to rectify the incident when the remediation team determines that the incident can be resolved.

33. The computer program product of claim 30 further comprising:
an executable portion configured for remediating the incident when the remediation team determines that the incident does not require reporting, escalating, or further investigation or resolution.

34. The computer program product of claim 23 further comprising:
an executable portion configured for re-rating the computer systems based on the riskiness of potential or actual threats or breaches of confidential information after the incident has been remediated.

* * * * *